United States Patent [19]

Schroeder et al.

[11] 3,960,337

[45] June 1, 1976

[54] OFFSET DRIVE PIN ADAPTORS FOR FILM PROJECTORS, FILM SPOOLS, AND 35MM TO 16MM CONVERTERS

[75] Inventors: Karl-Heinz Schroeder, Selent; Herbert Tuemmel, Kiel, both of Germany

[73] Assignee: Zeiss Ikon AG, Germany

[22] Filed: Oct. 1, 1974

[21] Appl. No.: 510,895

[30] Foreign Application Priority Data
Nov. 22, 1973 Germany............................ 2358224

[52] U.S. Cl............................. 242/68.3; 242/71.8
[51] Int. Cl.[2].................. B65H 17/02; B65H 75/18
[58] Field of Search............ 242/68.3, 71.8, 71.8 A, 242/68; 352/72, 73

[56] References Cited
UNITED STATES PATENTS

| 3,050,269 | 8/1962 | Iikura............................ | 242/71.8 A |
| 3,132,821 | 5/1964 | Herden......................... | 242/68.3 X |
| 3,508,719 | 4/1970 | Browning...................... | 242/71.8 A |

FOREIGN PATENTS OR APPLICATIONS

| 114,628 | 7/1945 | Sweden............................ | 242/68.3 |

Primary Examiner—Edward J. McCarthy
Attorney, Agent, or Firm—Hill, Gross, Simpson, Van Santen, Steadman, Chiara & Simpson

[57] ABSTRACT

A motion picture film spool and spool drive are provided respectively with cooperating drive pin receptacles and drive pin mounting apertures offset from a square spindle receptacle axis on the spool and from a square spindle axis on the spool drive, one receptacle or mounting aperture located radially through a corner of the square spindle of the drive or of the square aperture of the spool, and a second receptacle or mounting aperture on a normal to a side of the square spindle or the square aperture. A drive pin is selectively mounted in either aperture in the spool drive, so that the spool drive may be used with spools with offset drive pin receptacles in either position and the spool may be used with spool drives having offset drive pins in either position, as well as with each other.

8 Claims, 7 Drawing Figures

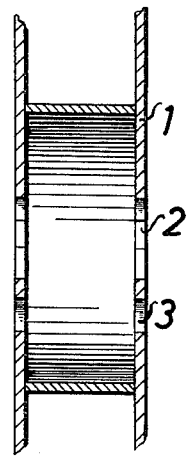
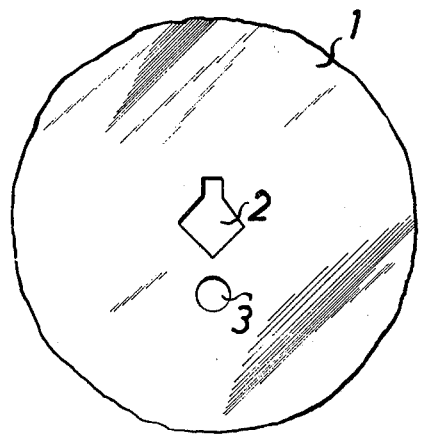
FIG. 1a
PRIOR ART
FIG. 1b
PRIOR ART
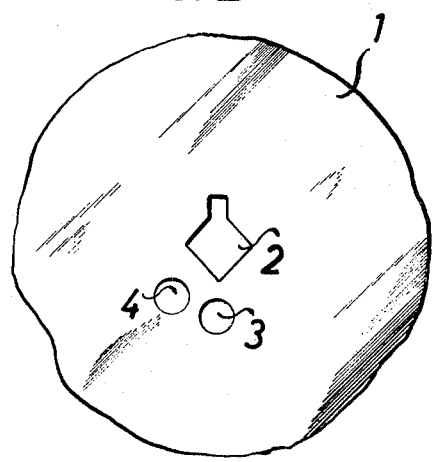
FIG. 2

OFFSET DRIVE PIN ADAPTORS FOR FILM PROJECTORS, FILM SPOOLS, AND 35MM TO 16MM CONVERTERS

BACKGROUND OF THE INVENTION

1. Field of the Invention

This invention relates to improvements in fittings used to drive spools of motion picture film.

2. Description of the Prior Art

Prior art film drives commonly use a spindle which is square or has ears projecting therefrom to engage and drive a spool mounted thereon. Where spools are of large diameters, stresses on the ears and corners of the spindle become excessive and breakage or slippage may result. Drive pins offset from the axis of the spindle have been used to avoid the breakage and slippage problem, but international standards have been lacking and consequently different designs have been employed for placement of the offset driving pin. Some drive pins are radially offset from a corner of the square spindle, while others are on a perpendicular to a side of the spindle. Spools and spool drives designed in one configuration are not adaptable to or useable with drives or spools designed in the other configurations. Drive systems convertible from, e.g. 35mm to 16mm film spools must also have means for converting from one drive pin location position to the other.

SUMMARY OF THE INVENTION

In accordance with the invention, a film spool is provided with a pair of offset drive pin receptacles. One drive pin receptacle is offset a distance from the axis of the spindle receptacle along a radius of the spool passing through one corner of the square spindle receptacle. The second drive pin receptacle is located the same distance from the axis of the spool but on a perpendicular to one of the sides of the square spindle receptacle. Thus the spool may be used with spool drives having their drive pins in either position.

Also in accordance with the invention, a film spool drive is provided with a pair of offset drive pin mounting apertures. One drive pin mounting aperture is offset a distance from the axis of its spindle along a radius of the drive flange passing through one quarter of the square spindle. The second drive pin mounting aperture is located the same distance from the axis of the flange but on a perpendicular to one of the sides of the square spindle. Thus the spool drive may be used with spools having their drive pin receptacles in either position. Further, a drive converter means for employing the spool drive with spools of different widths of film is provided embodying the concept of the invention, having an inner spacing member with first and second drive pin receptacles plus an auxiliary drive pin mounted in the spacing member and offset from the spindle axis to engage a spool.

BRIEF DESCRIPTION OF THE DRAWINGS

FIGS. 1a and 1b show a portion of a prior art spool in edge cross section and on its side, respectively.

FIG. 2 is a view of the improved spool of the present invention corresponding to the side view shown in FIG. 1b.

DESCRIPTION OF THE PREFERRED EMBODIMENTS

Figure 3A:
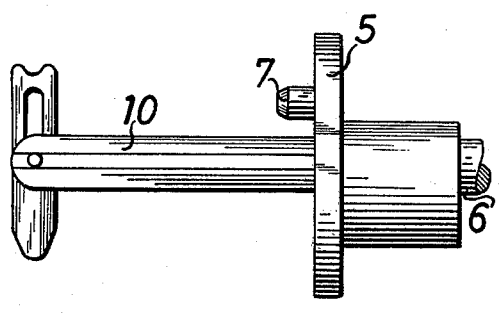
FIGS. 3a and 3b show the spool drive of the present invention in edge and partially cross sectional side views, respectively.

Reproduction spools for 16mm films according to Norm DIN 15621 are provided with spindle apertures of 8.1mm square. Where drive through this aperture becomes uncertain on account of deflection of the hole in the spool, particularly in the case of large spool diameters, an actuator aperture of 6mm diameter is provided, disposed at 11.5mm from the spindle axis. A corresponding pin from the projector is received in the aperture. The position of this 6mm aperture in reference to the square spindle aperture is not clearly determined but may be offset with respect to a corner of the square aperture by 45°, that is, disposed on the side of the square, as well as being in line with respect to the corner of the spindle aperture as shown in FIG. 1b. With a round spindle, that would present no difficulties. However, with a quadratic or square spindle, the acutator pin, whose position is fixed in relation to the spindle on the projector, might be offset in relation to the actuator hole of the spool. Thus, the spool could not be placed on the projector.

In order to overcome this disadvantage according to the invention, the spool is provided not only with a single hole of 6mm diameter, but with two holes, which are offset with respect to one another by 45° or by 135° in either direction, with one of the holes being radially adjacent a corner of the square spindle aperture. A further feature of the invention is to make the actuator pin of the projector removable and to provide on the projector two holes offset by 45° for the reception of the actuator pin. This actuator pin may then according to the type of the spool to be used, be brought into the correct position.

In the case of projectors which are provided for both 35mm films and for 16mm films, it is necessary for utilization of the 16mm spools to employ spacing members on the spindles so that the 16mm spools do not move axially on spindles of 35mm widths and may be held centrally to the 16mm film track. According to the invention a spacing member is provided on its spool side with a non-releasable pin and on its opposite side with two actuator holes offset by 45° to engage the actuator pin of the projector.

The invention will be explained in greater detail on the basis of embodiments shown by way of example in FIGS. 2 to 4. FIG. 1 illustrates the state of the art. A spool 1 has a central spool hole 2 which receives a square spindle of 8.1mm on a side and an eccentric or off-center drive pin hole 3 of 6mm diameter which engages an actuator pin provided on the projector at a corresponding point. Where the actuator pin is so disposed on the projector that it is offset in relation to the actuator hole of the spool, the spool cannot be mounted on the projector.

The invention of the present disclosure in one embodiment places a second drive pin receptacle 4 in the side of the spool 1 at a location radially offset from the first hole 3 by 45° or 135° in either direction, as shown in FIG. 2. Then the spool may be used with motion picture film spool drives having the drive pin in either a position adjacent a corner of the square spindle or in a position adjacent a side of the spindle.

Figure 3B:
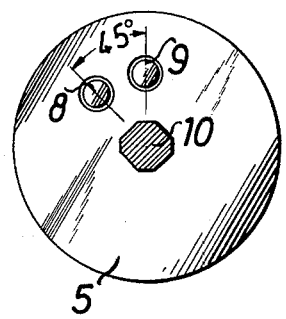

It is also comtemplated by the present invention as shown in FIGS. 3a and 3b to make the drive pin in the spool drive mountable in either position. The drive flange 5 in FIGS. 3a and 3b is mounted on a driven axle 6 and has an offset drive pin 7 selectively mountable in either a first drive pin aperture 8 offset from the flange axis normal to one of the sides of the spindle 10, or in a second drive pin aperture 9 offset on a radius through one of the corners of the spindle 10. The drive pin 7 may be made readily interchangeable between apertures 8 and 9 by any of several conventional means not shown, but which may include recessed ball, friction, or screw means.

Figure 4A:
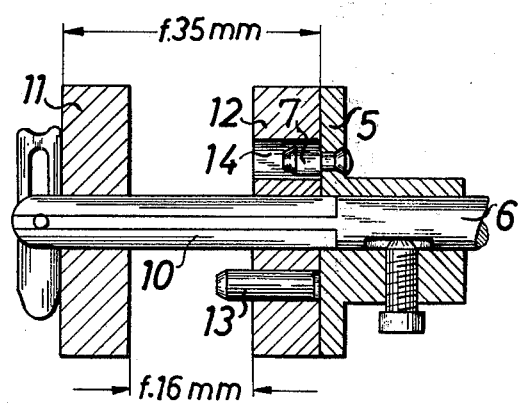
FIGS. 4a and 4b show the spool drive converter of the present invention in partially cross sectional edge and side views.
Figure 4B:
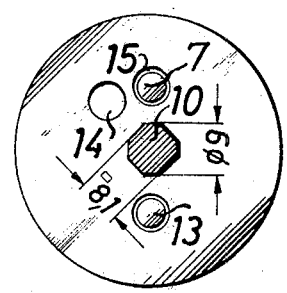

In the further embodiment shown in FIGS. 4a and 4b, a drive converter is provided for converting the spindle from, for instance, a 35mm drive to a 16mm drive, through use of outer and inner spacing members 11 and 12, respectively. The inner spacing member 12 is mounted on the spindle adjacent the flange 5 and is provided with offset drive pin receptacles 14 and 15 located adjacent a side and a corner of the substantially-square spindle 10, respectively, in accordance with the principles of the invention. The inner spacing member 12 also has an auxiliary drive pin 13 offset from the central axis of the spindle to correspond to the drive pin 7 shown in FIG. 3a, to engage a narrower spool mounted adjacent the inner spacing member 12. An outer spacing member 11 is secured to the end of the spindle on the side opposite the moving picture film spool and is fixed in that position by any conventional retaining means, such as the droppable bar shown.

We claim as our invention:

1. A motion picture film spool drive comprising:
   a substantially-square spindle having an axis, four corners, four sides, and an end;
   a flange affixed to said spindle at said end;
   a first drive pin aperture in said flange parallel to but offset from said spindle axis on a radius of the flange passing through one of said spindle corners;
   a second drive pin aperture in said flange parallel to but offset from said spindle axis on a radius of the flange passing normal to one of said spindle sides; and
   a drive pin selectively mountable in either of said first or second drive pin apertures and projecting from said flange parallel to said spindle for driving a spool mounted on said spindle whether said spool has a drive pin receptacle adjacent a corner of its spindle receptacle or adjacent a side thereof.

2. A motion picture film spool drive as defined in claim 1, further comprising a drive converter means, comprising:
   a first spacing member having:
   an axis,
   a spindle aperture on said axis through which said spindle may extend,
   first and second drive pin receptacles for receiving said drive pin whether said pin is in either the first or the second drive pin aperture in said flange, and
   an auxiliary drive pin mounted in said member offset from said axis and extending parallel to said spindle,
   thereby to engage and drive a spool mounted on said spindle; and
   a second spacing member mountable on said spindle, spaced from said first spacing member, which engages retaining means on said spindle opposite said flange to retain said spool on said spindle between said first and second spacing members.

3. For use with a film spool drive, a film spool for rotation on an axis and having a side normal to said axis, said spool having:
   a substantially-square aperture with four corners and four sides extending axially through said spool and centered about said axis;
   a first drive pin receptacle in said side spaced from said axis at a point on a radius passing through a corner of the square aperture; and
   a second drive pin receptacle in said side spaced from said axis at a point on a radius passing normal to a side of the square aperture,
   whereby said spool is adapted to be mountable on a film spool drive having an offset drive pin located either radially from a corner or on a perpendicular to a side of a square spindle.

4. A film spool and actuator device particularly characterized by said actuator device comprising means forming two actuator holes of which one is offset with respect to a corner of a square spool hole and the other by 45° or 135° therefrom on one of the adjacent sides of the square spool hole.

5. A film spool and actuator device as defined in claim 4, further comprising:
   a 6mm actuator pin engageable with the spool actuator device, characterized in that for the purpose of the insertability of 16mm spools which have only one actuator hole offset with respect to the corner of the square spool hole by 45° or 135°, respectively, and disposed on one of the sides of the square spool hole, the actuator pin on the projector side is interchangeably mountable in either of two receiving bores provided offset by 45° or 135° from one another.

6. A film spool and actuator device as defined in claim 4 in which for use of 16mm films on a substantially-square spindle adapted for 35mm spools, spacing members are provided, characterized by one said spacing member being equipped on the spool side with a non-releaseable pin and on the projector side with two actuator holes, one hole being offset by 45° from a corner of the square spool hole and another being radially aligned with said corner.

7. A motion picture film spool drive system comprising a film spool and a film projector drive,
   said spool and said drive each having a cooperating drive pin receptacle and drive pin respectively on each;
   the spool having
   a substantially square aperture with four corners and four sides extending axially through said spool and centered about said axis,
   a first drive pin receptacle in said side spaced from said axis at a point on a radius passing through a corner of the square aperture, and
   a second drive pin receptacle in said side spaced from said axis at a point on a radius passing normal to a side of the square aperture; and
   the film projector drive having
   a substantially-square spindle having an axis, four corners, four sides, and an end,
   a flange affixed to said spindle at said end,
   a first drive pin aperture in said flange parallel to but offset from said spindle axis on a radius of the flange passing through one of said spindle corners, a second drive pin aperture in said flange parallel to but offset from said spindle axis on a radius of the flange passing normal to one of said spindle sides, and a drive pin selectively mountable in either of said first or second drive pin apertures and projecting from said flange parallel to said spindle for driving a spool mounted on said spindle whether said spool has a drive pin receptacle adjacent a corner of its spindle receptacle or adjacent a side thereof;

the spindle and drive pin in the drive and the square aperture and drive pin receptacles in the spool being of a standard size, thereby to provide a film spool and a drive useable with one another and with any other drive and spool, respectively, having a drive pin and a drive pin receptacle, respectively, corresponding in position with one of the two positions provided by said system.

8. A motion picture film spool drive system as defined in claim 7, wherein said film projector drive further comprises a drive converter means having, a first spacing member having:
an axis,
a square spindle aperture on said axis through which said spindle may extend,
first and second drive pin receptacles for receiving said drive pin whether said pin is in either the first or the second drive pin aperture in said flange, and
an auxiliary drive pin mounted in said member offset from said axis and extending parallel to said spindle,
thereby to engage and drive a spool mounted on said spindle; and a second spacing member mountable on said spindle, spaced from said first spacing member, which engages retaining means on said spindle opposite said flange to retain said spool on said spindle between said first and second spacing members.

* * * * *